Nov. 12, 1957 W. H. BURKHART 2,813,259

MAGNETIC TAPE RECORDING SYSTEMS

Filed April 12, 1954 3 Sheets-Sheet 1

INVENTOR
WILLIAM H. BURKHART
BY William S. Glover
AGENT

INVENTOR
WILLIAM H. BURKHART
BY William S. Glover
AGENT

Nov. 12, 1957 W. H. BURKHART 2,813,259

MAGNETIC TAPE RECORDING SYSTEMS

Filed April 12, 1954

3 Sheets-Sheet 3

INVENTOR
WILLIAM H. BURKHART
BY William S. Glover
AGENT

United States Patent Office 2,813,259
Patented Nov. 12, 1957

2,813,259

MAGNETIC TAPE RECORDING SYSTEMS

William Henry Burkhart, East Orange, N. J., assignor to Monroe Calculating Machine Company, Orange, N. J., a corporation of Delaware Application April 12, 1954, Serial No. 422,385

23 Claims. (Cl. 340—174)

Figure 1:
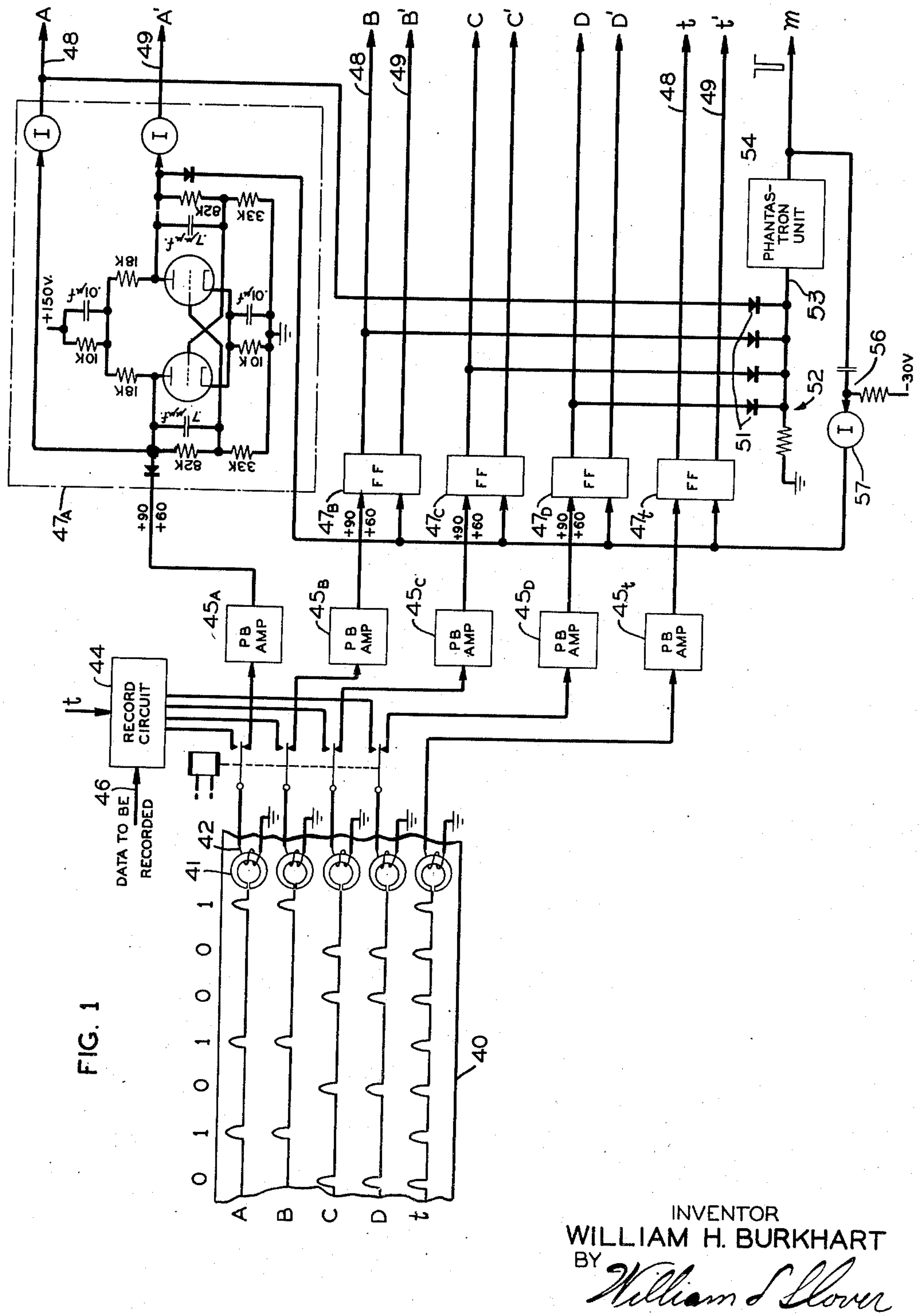

This invention relates to magnetic recording in general and more particularly to a method of and means for maintaining a high degree of reproduction accuracy in magnetic tape recording systems.

Magnetic tape has been widely used in electronic computers, and the like, for purposes of storing coded information thereon in the form of magnetized spots. Magnetic tape, however, in addition to being costly, has certain undesirable properties. Probably the most important of these properties is that magnetic tape usually is not magnetically uniform throughout its length with the result that certain portions thereof either cannot be magneized at all, or at least not sufficiently to effect generation of the required signal in reproducing operations. A second objectionable property of magnetic tape is that, upon repeated usage, previously satisfactory portions thereof become unusable magnetically. Another objectionable feature of magnetic tape systems is that spurious reproduction signals are obtained occasionally through erroneously recorded magnetic spots or through radiated interference, or the like.

It will readily be understood that in electronic computers, and the like, wherein the entry of an erroneous bit of information, or the failure to enter a bit of information, will greatly affect the accuracy of a computation, great care must be taken to insure that information transmitted to a magnetic tape actually is recorded thereon, that said recording remains capable of generating a reproduction signal of the required magnitude, and that spurious reproduction signals are not generated.

The principal object of the invention, therefore, is the provision of a method of, and means for maintaining a high degree of reproduction accuracy in magnetic recording systems.

According to the invention, a binary digit may be represented by recordings, or the lack of recordings, in related positions of four channels of a tape. Preferably binary one is represented by recordings in each of two channels and lack of recordings in the other two channels, while binary zeroes are represented by recordings in said other two channels and by the lack of recordings in the first two channels. However, if desired, any other suitable coding may be utilized for each half of the channels or for all of the channels. During reproduction or playback operations, the signals played back from the four channels are operated upon logically and a playback signal which reflects the identity of the binary digit zero or one played back from a majority of the channels, is produced. At the same time detection means scan the signals played back from the four channels to detect the occurrence of errors in the four representations of each binary digit. On occurrence of the single error, i. e., an erroneous playback signal from one channel, a signal is produced which marks the error and may be used to advance a counter, or the like, to denote the incidence of errors. The detection means also scan the playback signals from the four channels to note the occurrence of two errors of opposite kind in a code representation, i. e., an erroneous binary one signal from one channel and an erroneous binary zero from another channel. The occurrence of two errors, of course, eliminates the possibility of determining the true identity of a binary digit on a majority basis as no majority exists. Under these conditions, the detection means generate a signal which may be used to halt operation of the tape reproducer or in any other suitable way.

Preferably the data recorded on the tape is arranged in words, each containing a predetermined number of binary digits. According to the invention, the end of each word is signified by an "end of word" signal. In order to provide a signal denoting the occurrence of an erroneous "end of word" signal, or the dropping of a binary digit from a word, or the erroneous addition of a digit to a word, a counter counts the playback signals and controls circuitry which generates an alarm signal whenever an "end of word" signal occurs while the counter stands at any count other than zero or a predetermined count representative of the correct number of digits in a word; and which produces a similar signal when the counter advances one or more counts beyond the said predetermined count.

Figure 2:
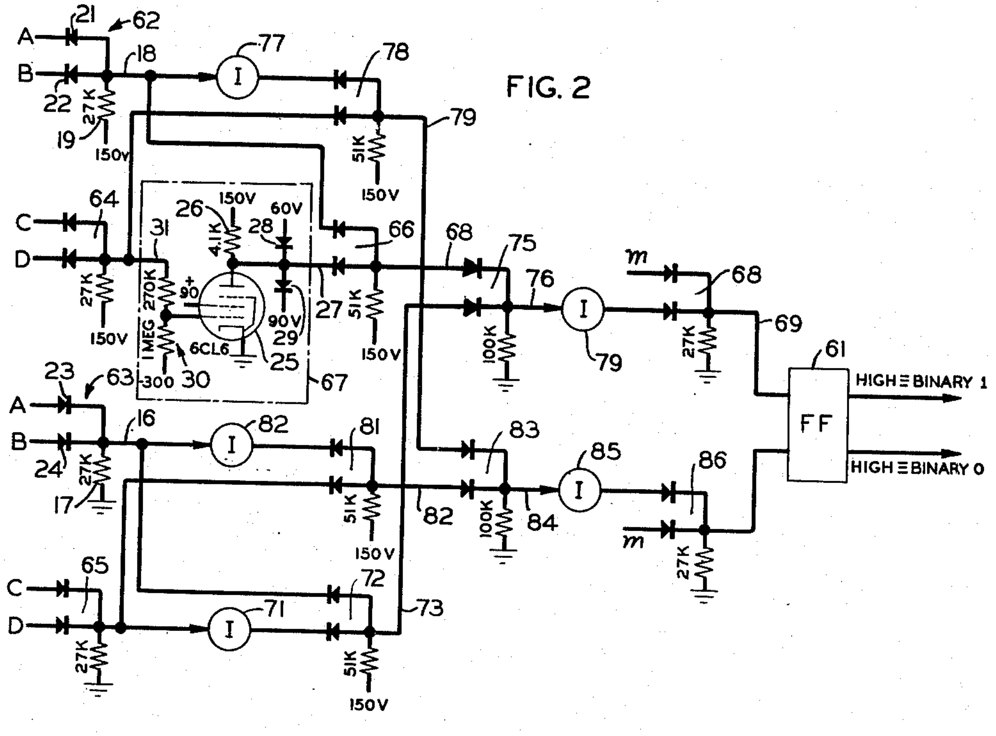
Figure 3:
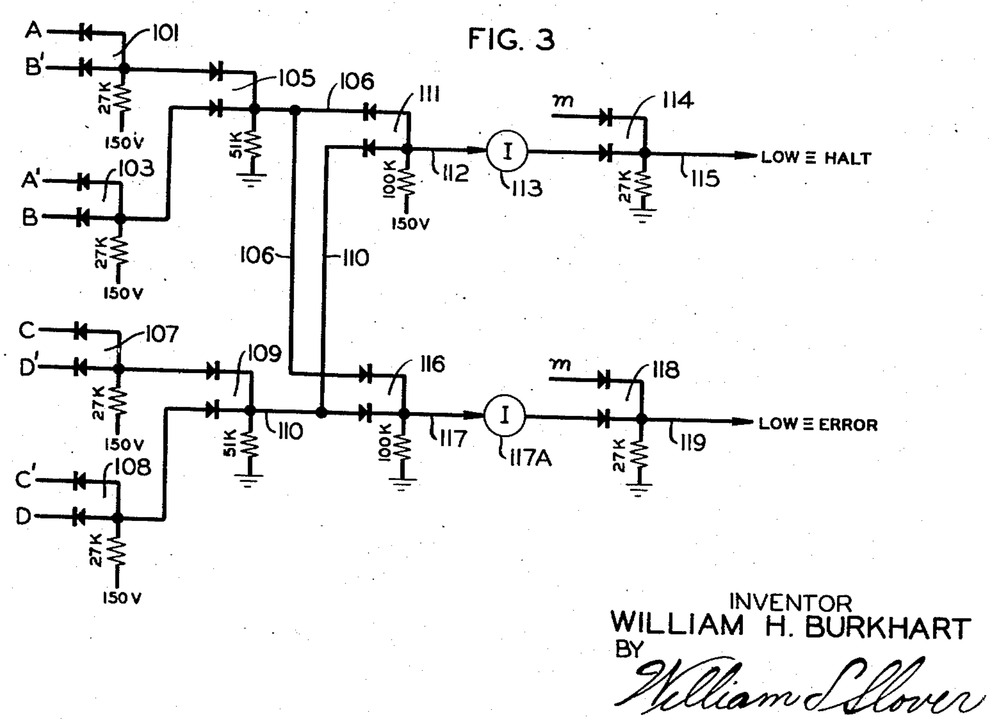
Figures 4, 5:
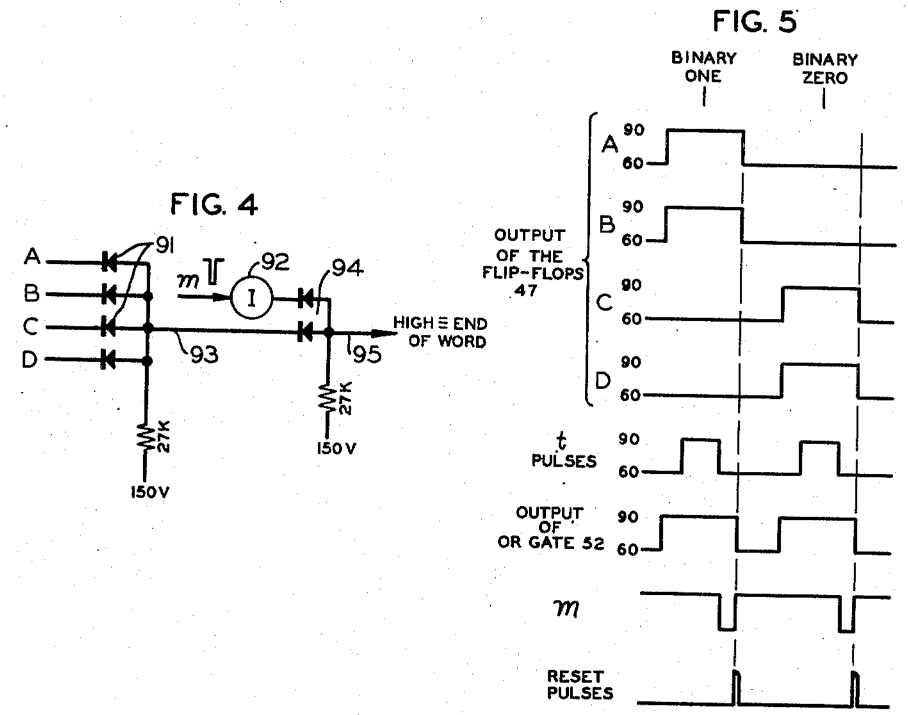
Figure 6:
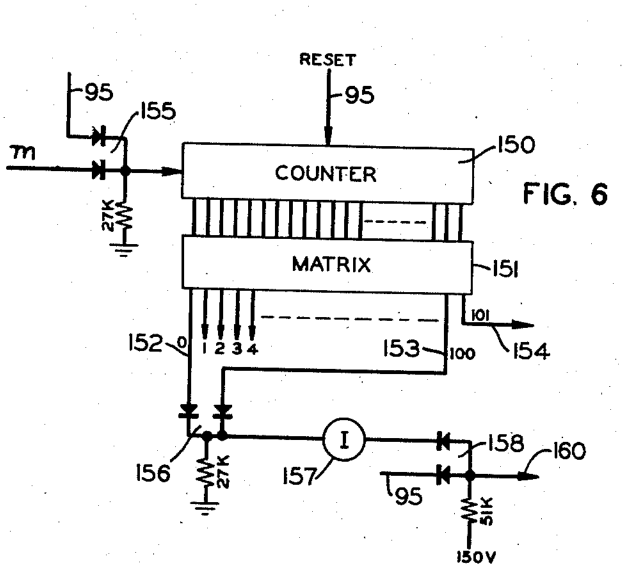

Other objects and features of the invention will become apparent from the following description when read in the light of the drawings, of which:

Fig. 1 is a partially diagrammatic block diagram of a portion of the means of the invention, Fig. 2 is a schematic and block diagram of the comparison means of the invention and other allied parts thereof, Fig. 3 is a schematic and block diagram of the detection means of the invention, Fig. 4 is a schematic and block diagram of means for recognizing "end of word" signals as played back from the tape, Fig. 5 is a simple pulse diagram illustrating the mode of operation of the means of the invention, and Fig. 6 is a schematic and block diagram of the means for counting the number of binary digits in each word and performing the associated control functions.

Before entering into a detailed description of the means of the invention it is deemed desirable first to describe certain logical or building block circuits which are utilized repetitively.

Referring to Fig. 2, the reference numeral 62 indicates a coincidence or "and" gate comprising a pair of diodes 21 and 22 having their anodes coupled together. A resistor 19 is connected between the coupled anodes of the diodes and a source of positive potential, say +150 volts. An output line 18 for the circuit is projected from the coupled anodes. High (+90 volts) and low (+60 volts) potentials are applied to the cathodes of the diodes at A and B. Coincidence application of high potentials to both input A and B effects production of a high potential on output line 18. When either or both of the inputs A and B are low, the potential on output line 18 is also low.

Referring again to Fig. 2, the reference numeral 63 designates an "or" gate comprising a pair of diodes 23 and 24 having their cathodes coupled together. A resistor 17 connects the coupled cathodes to ground. An output line 16 is projected from the coupled cathodes and assumes a high potential (90 volts) whenever a high potential is applied to the anode of either or both of the diodes at A and B. Output line 16 assumes a low potential (60 volts) only when inputs A and B are both low.

In coupling together a plurality of diode logic circuits of the sort described hereinabove, each is especially designed to function on the same signal level as the preceding one; and at intervals in the coupling amplifying means are provided to compensate for power losses. In order to maintain the described high and low signal potentials throughout a series of the described logic circuits, the resistors of the circuits of the series are of substantially different magnitudes. In the illustrated instance of the invention, an amplifier is provided after every third logic circuit of a series and 27,000 ohm, 51,000 ohm and 100,000 ohm resistors are used for the first, second and third circuits respectively of each group of three.

Still referring to Fig. 2, the reference numeral 67 indicates an amplifier of the sort mentioned above. As illustrated, the amplifier comprises a power pentode 25 whose cathode and suppressor grid are grounded and whose screen grid is connected to a source of suitable positive potential. The anode of the pentode is connetced through a resistor 26 to a source of +150 volts. An output line 27 is extended from the anode of the pentode and is clamped by means of diodes 28 and 29 to potentials of +60 and +90 volts respectively. The control grid of the pentode is connected to the juncture of the two resistors of a voltage divider 30 connected between an input line 31 to the amplifier and a source of −300 volt potential. Divider 30 serves to convert the +90 and +60 volt potentials applied to the input line 31 to potentials (+10 and −16 volts) more suitable for application to the control grid of the pentode. Utilizing the tube type and the component values indicated in the drawing, the application of a high (90 volts) to input line 31 results in a low (60 volts) output on line 27. Conversely, the application of a low at the said input line results in the production of a high on output line 27. The amplifier also functions as a signal inverter and in several instances is used as such in the circuit of the invention. For convenience, the amplifier-inverter is illustrated symbolically throughout the drawings by an encircled I.

Referring to Fig. 1, the reference numeral 47 is used to designate a plurality of flip-flops of which one is shown in detail. As illustrated, the flip-flop comprises the very familiar grid-to-plate coupled pair of triodes which have two stable states, i. e. either triode conducting with the other triode cut off. The flip-flop unit also includes a pair of isolating diodes each having its anode connected to the anode of one of the flip-flop triodes and a pair of inverters each connected to a said anode and from which the outputs of the flip-flop are taken. Application of a low potential (60 volts) to the cathode of the diode connected with the non-conducting triode pulls the anode potential of the latter down to the 60 volt level and the state of the flip-flop is changed in well known manner. The design and mode of operation of flip-flops are so well known in the art, that the same will not be described further.

Referring to Fig. 1 the reference numeral 40 indicates a magnetic tape which may be of any sort adapted to receive spot magnetizations. According to the invention, tape 40 is provided with four longitudinal tracks or channels, A, B, C, and D. Associated with each channel is a recording and reproducing head 41 having a coil 42. These heads are aligned with one another transversely of the tape in the illustrated instance of the invention, but, if desired, the heads may be offset from one another longitudinally of the tape to guard against the possibility of more than one head operating on a defective section of tape at one time. By a "defective section of tape" is meant a small area which either cannot be magnetized at all, or at least not sufficiently to effect generation of a required reproduction signal.

On tape 40, a binary one is represented by a magnetized spot in each of tracks A and B and the absence of magnetized spots in tracks C and D. Conversely a binary zero is represented by a magnetized spot in each of tracks C and D and the absence of magnetized spots in tracks A and B. It will be undertsood, of course, that if desired, any other suitable coding may be utilized for each half of the channels or for all of the channels.

If desired, a fifth, timing or synchronizing channel of the tape may be provided with a spot recording in each longitudinal position of the tape at which it may be desired to record binary units of data. The timing magnetizations may be used to accurately time the recording of information and thereby to accurately position the magnetized spots resulting from such recording. Also, if desired, the pulses generated by said timing magnetizations may be used in conjunction with a counter to assist in locating recorded items of information for playback purposes.

Each head 41 cooperates with a record circuit 44 and a playback or reading circuit 45. The playback and recording circuits may be isolated from one another in any suitable way, as for example, by electronic switching circuits. For simplicity, however, the isolating means shown in the drawing comprises relay operated transfer contacts which connect the recording and playback circuits with the heads 41 alternatively.

In order to eliminate the need for erasing heads and circuits, record circuit 44 is arranged to produce substantially constant bias currents in the record-head coils 42 except when it is desired to record a binary item of intelligence at which time current pulses of opposite polarity are produced in the coils associated with the appropriate tape channels A and B or C and D. The bias currents magnetically saturate the tape channels with one polarity and the current pulses magnetically saturate minute areas or spots thereof with the opposite polarity. Each is capable of overcoming the magnetic saturation effected by the other. Record circuit 44 may be of any suitable sort adapted to function in the described manner under control of data input signals and synchronizing or timing signals from timing track *t* or from some other source. In this regard, it is to be mentioned that where the tape is used with an electronic computer or the like the timing signals may be obtained from the computer rather than from a timing track on the tape. Record circuit 44 forms no part of the present invention and need not, therefore, be described in detail. However, it is worthwhile to mention that the record circuit may comprise flip-flop arrangements which produce the bias current when in one state and the current pulses when flipped momentarily to the opposite state.

Each playback circuit 45 controls a flip-flop 47 and may be of any sort capable of applying a low (60 volt) potential to the flip-flop to pull the same to a "set" state on playback of a magnetized spot and a high (90 volt) potential at other times. For example, the playback may comprise one or more amplifiers whose output is applied directly to the grid of an inverter of the type described above. The "set" state of each of the flip-flops 47 is defined as that in which an output line 48 thereof assumes a high potential and an ouptut line 49 thereof assumes a low potential (see also Fig. 5). Conversely, the "reset" state of each of the flip-flops 47 is defined as that in which output line 48 is low and output line 49 is high. In order to differentiate between the several output lines 48, each is designated by the letter A, B, C, D or *t* appropriate to the channel with which it is associated. In like manner, the lines 49 are differentiated by the designations A′, B′, C′, D′, and *t*′.

Each output line 48 is connected to the plate of a diode 51 of an "or" gate 52 whose output line 53 is applied to a Phantastron circuit 54. Whenever a magnetized spot is sensed by one or more of the record heads 41, the associated flip-flop output line or lines 48 goes high and the "or" gate effects application of a high potential (see Fig. 5) to the Phantastron circuit 54 to trigger the latter. The function of the Phantastron circuit which may be of the sort described in Chapter II of the text "Principles of Radar" published 1946, McGraw-Hill Book Co., is to produce negatively directed master pulses *m* which are delayed in time with respect to the action which initiated production thereof (playback of a magnetized spot) a predetermined amount. Preferably the Phantastron circuit is adjusted to produce master pulses *m* which drop from the 90 volt level to the 60 volt level.

The master pulses *m* are utilized for two purposes, first they are used to time certain logical operations which the means of the invention perform upon the outputs of the flip-flops 47 at each "setting" of the latter, and second, they are used to effect "resetting" of the flip-flops 47 just prior to each "setting" thereof. The former is accomplished during the span of each master pulse and the latter is initiated by the trailing edge thereof. It is to be noted that this arrangement permits of the maximum time delay between the sensing of a magnetized spot in a tape channel and the logical operations upon the outputs of the flip-flops 47. Thus, delays in setting one or more of the flip-flops 47 due to misalignments of one or more reading heads 41, stretching or skewing of the tape, or other causes, are compensated for, within the capacity of said maximum time delay, and misoperations of the means of the invention are prevented.

In order to effect resetting of the flip-flop 47 the master pulses *m* produced by Phantastron 54 are applied to an RC differentiator 56 whose output controls an inverter-amplifier 57 of the type described hereinabove. Amplifier-inverter 57 serves as a puller to "reset" the flip-flops 47, and, accordingly, its output is applied to the appropriate puller-isolating diode of each flip-flop. Conveniently, the input voltage divider of the puller 57 may be eliminated and the resistor of the differentiator connected to a source of negative potential, say −30 volts, to maintain the puller in the "cut-off" state. On application of a negatively directed master pulse *m* to the differentiator the latter first delivers a sharp negatively directed impulse to the already cut-off puller 57, then, on the occurrence of the positively directed lagging edge of the master pulse, delivers a sharp positively directed pulse to the puller. This positive pulse effects conduction of the puller and the latter produces a "low" output which pulls the flip-flops 47 to their "reset" state.

It will be seen, therefore, that the means thus far described are capable of playing back the intelligence recorded on a magnetic tape, setting a series flip-flop 47 differentially in accordance with the identity of each unit of such intelligence, and of conditioning the Phantastron unit 54 on setting of any said flip-flop, to reset all of the flip-flops to a predetermined state preparatory to playing back of another unit of intelligence.

It will be noted that in the illustrated instance of the invention, the playback signals from the timing and synchronizing track *t* of the tape are not used to control the "or" gate 52. Thus, the system is ideally adapted for asynchronous recording and playback operations. However, if desired, the signals from a timing track *t* may be used to control the gate 52 to effect a synchronous mode of operation.

As described hereinabove, magnetized spots are recorded in channels A and B of the tape to represent binary one and in channels C and D to represent binary zero. Therefore, in the absence of errors flip-flops $47_A$ and $47_B$ are "set" on playback of a binary one while flip-flops $47_C$ and $47_D$ remain in their "reset" states; and on playback of a binary zero flips-flops $47_C$ and $47_D$ are "set" while flip-flops $47_A$ and $47_B$ remain "reset." This operational perfection may be disturbed, however, by errors which for the most part stem from either of two general causes. First, a defective section of tape which cannot be magnetized at all, or at least not sufficiently to effect generation of the required reproduction signal, and, second, spurious playback signals occasioned by radiated interference or erroneously recorded magnetic spots on the tape. These errors appear as erroneous "settings" of the flip-flops 47 or failures to "set" the same.

According to the invention the "settings" of the flip-flops 47 are interpreted on a majority basis, that is, whenever the "settings" of three or more of the flip-flops indicate binary one, such "setting" is interpreted as binary one;

and when the "settings" of a majority of the flip-flops indicate binary zero the said "settings" are interpreted as such. In those instances wherein the setting of one of the flip-flops $47_A$ and $47_B$ and one of the flip-flops $47_C$ and $47_D$ indicate either binary one or binary zero while the other two flip-flops indicate the opposite of said binary digits, the "settings" of the flip-flops are not interpreted as either binary one or binary zero, but are interpreted as an error. The following chart illustrates the "settings" of the flip-flops which are interpreted as binary one and binary zero and also the "settings" which are interpreted as errors.

It will be noted that the chart includes two conditions which have not been discussed; namely, that in which all of the flip-flops 47 are in their "reset" state and that in which all of said flip-flops are in their "set" state. The latter condition, where all of the flip-flops are "set," is used as a special code representation which will be discussed further hereinafter. The other condition, where the flip-flops are all "reset" is handled as a special case and will also be discussed further hereinafter.

| | $47_A$ | $47_B$ | $47_C$ | $47_D$ |
|---|---|---|---|---|
| 1. Binary one | set | set | reset | reset. |
| 2. Binary one | set | reset | reset | reset. |
| 3. Binary one | reset | set | reset | reset. |
| 4. Binary one | set | set | set | reset. |
| 5. Binary one | set | set | reset | set. |
| 6. Binary zero | reset | reset | set | set. |
| 7. Binary zero | reset | reset | reset | set. |
| 8. Binary zero | reset | reset | set | reset. |
| 9. Binary zero | set | reset | set | set. |
| 10. Binary zero | reset | set | set | set. |
| 11. Detected error | set | reset | set | reset. |
| 12. Detected error | reset | set | set | reset. |
| 13. Detected error | set | reset | reset | set. |
| 14. Detected error | reset | set | reset | set. |
| 15. "End of word" signal | reset | reset | reset | reset. |
| 16. | set | set | set | set. |

Evidently the occurrence of a single error in a code representation is overcome and the correct interpretation placed on the code representation. However, when two errors such as those represented on lines 11, 12, 13 and 14 of the chart appear in a single code representation they are not overcome, but, rather the representation is interpreted as an error. The conditions shown on lines 15 and 16 of the chart will be discussed hereinafter.

A preferred form of logical circuitry capable of effecting the mode of operation described above and illustrated in the chart will now be described.

The outputs A and B of flip-flops $47_A$ and $47_B$ are applied to an "and" gate 62 and an "or" gate 63 (Fig. 2). In like manner the outputs C and D of flip-flops $47_C$ and $47_D$ are applied to an "and" gate 64 and an "or" gate 65. The output of "and" gate 62 is applied directly to an "and" gate 66 and, also, through an inverter 77 to an "and" gate 78. The output of "and" gate 64, however, is applied directly to the "and" gate 78 and through an inverter 67 to the "and" gate 66. The outputs of the "or" gates 63 and 65 are applied directly to "and" gates 72 and 81 respectively and through inverters 82 and 71 to the opposite ones of said gates 81 and 72. The outputs of the "and" gates 66 and 72 are applied to an "or" gate 75 and the outputs of the "and" gates 78 and 81 are applied to an "or" gate 83. Gates 75 and 83 are provided with output lines 76 and 84 respectively.

The circuit arrangement thus far described is such that when the outputs A and B are high and the outputs C and D are low to represent a binary one, gates 62 and 63 produce high outputs (90 volts) while the gates 64 and 65 produce low outputs (60 volts). The high output from gate 62 effects conduction of the related inverter 77 and the latter applies a low potential to gate 78 which therefore applies a low potential to the gate 83. At the same time the high output of gate 63 is inverted by the inverter 82 and gate 81 applies a low potential to the gate 83. Evidently, therefore, gate 83 produces a low output on its output line 84. Concurrently, the gates 66 and 72 produce high outputs due to the high inputs applied thereto by gates 62 and 63 and by the cut off inverters 67 and 71. These high outputs are applied to the gate 75 which produces a high output on its output line 76. It is believed evident that when the outputs C and D are high and the outputs A and B are low to represent a binary zero, the circuit operates in opposite manner and gate 75 produces a low output while gate 83 produces a high output. Thus binary one is indicated by a high on line 76 and a low on line 84 while binary zero is represented by a high on the line 84 and a low on line 76.

The lines 76 and 84 are applied to inverters 79 and 85, respectively. The output of inverter 79 is applied to an "or" gate 68 and the output of inverter 85 is applied to an "or" gate 86. The "or" gates 68 and 86 function as pullers for setting and resetting a flip-flop 61 and are also controlled by the master pulses *m*.

The arrangement is such that when line 76 assumes a high potential to indicate binary one as described above, the inverter 79 conducts and applies a low potential to "or" gate 68 which, on the occurrence of the next following master pulse *m*, produces a low output which pulls the flip-flop 61 to its binary one indicating condition. On the other hand, when line 84 assumes a high potential to represent a binary zero, the inverter 85 conducts and applies a low output to gate 86 which on the occurrence of the next following master pulse *m* pulls the flip-flop 61 to its binary zero indicating condition.

The circuit of Fig. 2 also operates to "set" the flip-flop 61 to represent the appropriate binary digit when one of the four code representations A, B, C and D of a said digit is in disagreement with the others; that is, when one indicates the opposite one of the binary digits zero and one to that indicated by the other three. For example, the flip-flop 61 is set to indicate binary one when the lines A, C and D assume low potentials and the line B assumes a high potential to represent binary one, even though, properly line A should also assume a high potential. Under these conditions the high potential on line B causes "or" gate 63 to apply a high potential to "and" gate 72 which also has a second high potential applied thereto by inverter 71, which is maintained cut-off by the low output of "or" gate 65. Therefore, gate 72 applies a high potential to "or" gate 75 which, in turn, effects conduction of the inverter 79 to prepare "or" gate 68 to pull the flip-flop 61 to its binary one indicating condition on the occurrence of the next following master pulse *m*. In like manner, when lines A, B and C are low and line D is high, the flip-flop 61 is set to indicate binary zero even though line C should also be high to properly represent binary zero. In this example, "or" gate 65 produces a high output which is applied to "and" gate 81 along with the high output of inverter 82. Gate 81, in turn, applies a high output to "or" gate 83 which effects conduction of inverter 85. This conditions gate 86 to pull flip-flop 61 to its zero indicating condition on occurrence of the next master pulse *m*.

It will be noted that the described mode of operation of the "or" gates 63 and 65 is the same no matter which one of the inputs of each is in error.

The circuit of Fig. 2 is not capable of accurately determining the true identity of a binary digit whose code representation A, B, C and D contains two errors, that is, when two of the lines A, B, C and D assume the wrong potentials. These two errors can occur in any of six different combinations in a given code representation. Erroneous potentials of one of the lines A and B and on one of the lines C and D account for four of these possibilities as indicated in the above chart, while the other two possibilities occur when all of the lines A, B, C and D assume high potentials and when they all assume low potentials. These latter two possibilities will be discussed further hereinafter.

In order to indicate that an uncorrected error has occurred, whenever one of the lines A and B and one of the lines C and D assume erroneous potentials, the means of the invention are enabled to produce a signal which may be used to stop the tape reading means or to perform any other suitable task. A preferred circuit for performing this indicating function is illustrated in Fig. 3.

Referring to Fig. 3 the output lines A and B' of Fig. 1 are applied to an "and" gate 101 while the inversions thereof, namely lines A' and B are applied to an "and" gate 103. In like manner, lines C and D' are applied to an "and" gate 107 while lines C' and D are applied to an "and" gate 108. The outputs of gates 101 and 103 are applied to an "or" gate 105 and the outputs of gates 107 and 108 are applied to an "or" gate 109. The outputs of gates 105 and 109 are applied via conductors 106 and 110 to an "and" gate 111 whose output line 112 is applied to an inverter 113.

The circuit thus far described is such that whenever all of the flip-flops 47 are set correctly to represent a binary one or a binary zero, all of the gates 101, 103, 107 and 108 produce low outputs, as at least one low potential input is applied to each. For example, when the flip-flops are set to represent binary one, a low input B' is applied to gate 101, a low input A' is applied to gate 103, a low input C is applied to gate 107, and a low input D is applied to gate 108. Again when the flip-flops are set to indicate binary zero a low input A is applied to gate 101, a low input B is applied to gate 103, a low input D' is applied to gate 107 and a low input C' is applied to gate 108. The low outputs from the gates 101, 103, 107 and 108 cause the gates 105 and 109 to apply low potentials to the conductors 106 and 110. These low potentials cause gate 111 to produce a low output on the conductor 112 and the inverter 113 is cut off. However, when one of the flip-flops 47A or 47B is "set" incorrectly and one of the flip-flops 47C or 47D is "set" incorrectly, two of the gates 101, 103, 107 and 108 produce high outputs. For example, if flip-flop 47A is "set" to apply a high potential to its output line A, while flip-flop 47B is "set" to apply a low potential to its output line B and flip-flop 47C is "set" to apply a low potential to its output line C and flip-flop 47D is "set" to apply a high potential on its output line D, gates 101 and 108 apply high output potentials to the gates 105 and 109, which in turn apply high potentials to the gate 111. Gate 111, therefore, applies a high potential to conductor 112 to effect conduction of inverter 113. It is believed evident that the circuit of Fig. 3 operates in similar fashion under control of the other three 2-error combinations.

Whenever only one error occurs in a given code representation a low potential is applied to line 112. For example, when the lines A, B and C, rather than only lines A and B, assume high potentials and line D assumes a low potential to indicate binary one, gate 107 produces a high output potential while gates 101, 103 and 108 produce low output potentials. The high potential output of gate 107 is passed on by "or" gate 109 to the "and" gate 111. However, inasmuch as a low potential is also applied to gate 111 by "or" gate 105, which is controlled by the low outputs of gates 101 and 103, gate 111 produces a low output potential on line 112. This same mode of operation holds true for all of the other possible single error combinations.

It will be seen, therefore, that line 112 assumes a low potential to indicate the absence of errors, and also when only one error occurs in a code representation, but assumes a high potential whenever two errors cause one of the flip-flops 47 to be set to indicate binary one erroneously and another one of said flip-flops to be set to indicate binary zero erroneously. As mentioned above, conductor 112 controls an inverter 113 whose output is applied to an "or" gate 114 along with the master pulses *m*. The arrangement is such that whenever two errors of the sort described, occur in a code combination, gate 114 is conditioned to produce a low potential on output line 115 on the occurrence of the next following master pulse *m*. This signal on line 115 may be used to halt the tape reading means or may be used in any other suitable fashion. The potential of line 115 is, of course, high at all other times.

In order to mark the occurrence of single correctable errors in code representations and thus to measure the efficiency of the system and the quality of the magnetic tape, the output lines 106 and 110 (Fig. 3) of the gates 105 and 109, respectively, are applied to an "or" gate 116. It will be remembered that whenever a single correctable error occurs in a given code combination one or the other of the lines 106 and 110 assumes a high potential. Therefore, gate 116 applies a high potential to its output line 117 whenever a said error occurs. Line 117 is applied to an inverter 117A whose output, in turn, is applied to an "or" gate 118 along with the master pulses *m*. The arrangement is such that whenever a single, correctable error occurs in a given code representation the inverter 117A conducts and applies a low potential to gate 118 to condition the same to apply a low potential to its output line 119 on the occurrence of the next following master pulse *m*. Line 119, of course, is maintained at a high potential at all other times. The signals on line 119 may be used in any suitable manner. For example, they may be used to advance a counter which, at any given time, would indicate the number of errors which had occurred.

It is usual in the electronic calculator art to arrange series of binary digits as "words" each containing a specific number of digits. In the illustrated instance of the invention the information recorded on tape 40 (Fig. 1) is arranged in "words" containing 100 binary digits each. In order to signify the end of each "word," a special "end of word" signal is recorded on the tape. In the present instance, this signal consists in recording a magnetic spot in each of the four channels A, B, C and D. Preferably the "end of word" signal is recorded two or more times to insure that, during playback operations, it has the appropriate effect on the means controlled by the tape. A simple circuit for interpreting the recorded "end of word" signals and for producing an electrical indication of their occurrence is illustrated in Fig. 4. As shown, the playback outputs A, B, C and D are applied to an "and" gate 91 which applies a high potential to its output line 93, only when all of said outputs A, B, C and D are high. Line 93 is applied to an "and" gate 94 along with the output of an inverter 92 which is controlled by the master pulse *m*. Thus, whenever an "end of word" signal is played back the gate 91 produces a high output which conditions gate 94 to apply a high potential to its output line 95 on the occurrence of the related master pulse *m*. Line 95, of course, assumes a low potential at all other times. The signals on line 95 may be utilized in any desired way. For example, they may be combined with the playback signals appearing on the output lines of the flip-flops 47 to indicate the ends of words represented by said outputs.

At this point it is deemed desirable to discuss the two conditions under which two errors in a code representation are not detected by the means thus far described. These two conditions arise when all of the flip-flops 47 assume their "set" states or when all of said flip-flops assume their "reset" states. The former of these conditions, of course, has been appropriated for use as the "end of word" signals described above. According to the invention the bits of each "word" are counted and an alarm initiated whenever an "end of word" signal is played back before a predetermined count is reached and whenever a said predetermined count is exceeded; said predetermined count being equal to the number of digits in a "word," in the present instance, 100. It will readily be seen that this mode of operation takes into account the erroneous production of an "end of word" signal, the erroneous inclusion of an extra binary digit in a word, and also the dropping of a binary digit because of the erroneous assumption of the "reset" states by two of the flip-flops 47. A simple circuit to carry out the described mode of operation is illustrated in Fig. 6. As shown, the circuit includes a binary counter 150 having sufficient capacity to advance through more than 100 counts, and a matrix 151 controlled by the counter. Matrix 151 is provided with three output lines of which one, designated 152, assumes a high potential when the counter stands at zero, a second, designated 153, assumes a high potential when the counter stands at a count of 100, and a third, designated 154, assumes a high potential when the counter attains a count of 101. Counter 150 is advanced by negatively directed pulses produced by an "or" gate 155 whose output line is connected thereto. "Or" gate 155 is controlled jointly by the negatively directed master pulses *m* from Phantastron unit 54 (Fig. 1) and by the positively directed "end of word" signals appearing on the output line 95 of the circuit of Fig. 4. The arrangement is such that normally each master pulse *m* causes gate 155 to produce a negatively directed output pulse which advances counter 150 one step. However, on generation of an "end of word" signal on line 95, the output of gate 155 is maintained high and the coincident master pulse *m* is ineffective to advance the counter. The "end of word" signals appearing on line 95 are also applied to the counter to "reset" the same, in known manner. It will be seen, therefore, that counter 150 is advanced one step for each digital code representation played back from the tape 40 and is "reset" to its initial zero count on the occurrence of each "end of word" signal. Binary counters and methods for "setting" and "resetting" the same and matrices controlled by such counters, are so familiar in the art it is not deemed necessary to describe the same further, nor to illustrate the details thereof.

Output lines 152 and 153 of matrix 151 are applied to an "or" gate 156 which produces a high output potential whenever one of said lines assumes a high potential to indicate that the counter stands at a count of zero or 100. The output of gate 156 is applied to an inverter 157 which controls an "and" gate 158 along with the "end of word" signals appearing on the output line 95 of the circuit of Fig. 4. Inverter 157 is cut off to apply a high potential to gate 158 only when neither of the output lines 152 and 153 of the matrix are high, that is, when the counter stands at any count other than zero or 100. Therefore, gate 158 produces a high potential on its output line 150 whenever an "end of word" signal occurs on line 95 and counter 150 stands at some count other than zero or 100. The signals on output line 160 may be used in any suitable manner. For example, they may be used to halt operations the same as the output line 115 of Fig. 3.

The output line 154 of matrix 151 which assumes a high potential to indicate that counter 150 has attained a count of 101, also may be used in the same manner as output lines 115 and 119, that is, to halt operations. The purpose of this, of course, is to warn the operator of the device that a word which has been played back contains more binary digits than it should, in the present instance, 101 or more. It will be realized, of course, that when the device functions correctly the counter 150 does not attain a count of 101 and therefore line 154 does not assume a high potential.

It will be seen therefore, that the invention has provided a method of and means for maintaining a high degree of reproduction accuracy in magnetic tape recording systems. The method of the invention contemplates the detection and correction of single errors in code combinations, and the detection, but not correction, of two errors of any code combination. No provision is made for more than two errors per code representation, as the probability of errors of this sort are extremely small. Specifically, the method comprises recording each binary digit in four channels; binary ones being represented by magnetized spots in two of the channels and the absence of spots in the other two, and binary zero being represented by magnetized spots in said other channels and the absence of spots in the first two channels in the illustrated instance of the invention. If desired, this arrangement can be modified in various ways. For example, binary ones may be represented by recordings of one polarity in each of two channels and recordings of the opposite polarity in the other two channels, or, the same recording arrangement may be utilized in all channels, etc. The second step in the method of the invention is to play back the data in all four channels and produce an output signal representative of the binary digit indicated by a majority of the playbacks. Where no majority exists by virtue of two errors of opposite sort in a given code representation, an alarm signal is generated. Also, signals are generated to indicate the occurrence of single errors in code representations. These steps provide a high degree of reproduction accuracy for magnetic tape systems. In order to obtain an even greater degree of reproduction accuracy, the data to be stored is recorded on the tape in the form of "words" each containing a predetermined number of digits, and, an "end of word" signal is recorded on the tape after each "word." During playback operations the number of played-back digits are counted and an alarm generated whenever the number of digits which precede an "end of word" signal is not equal to said predetermined number.

The described means for carrying out the method of the invention are extremely simple and may be modified in many respects. For example, suitable vacuum tube circuits may be substituted for the crystal diode circuitry of Figs. 1–4 and 6, etc.

While there has been above described but a single embodiment of the invention, many modifications and additions may be made therein without departing from the spirit of the invention and it is not desired, therefore, to limit the scope of the invention except as set forth in the appended claims or as dictated by the prior art.

I claim:

1. In a magnetic spot recording system wherein information is recorded on a movable magnetic storage medium, the combination of means for recording each item of information in a plurality of channels of the medium, in accordance with one code in half of the channels and in accordance with another code in the other half, playback units associated with said channels and driven substantially simultaneously by the recordings of each item of information, settable means for producing an output signal representative of each item played back by the playback units, logical circuit means controlled by the playback units and capable of setting the settable means to produce a signal representative of the item of information played back by a majority of the playback units.

2. The combination according to claim 1 and including a second logical circuit means controlled by the playback units and capable of producing an error indicating signal whenever a majority, but not all, of the outputs of the playback units are alike.

3. The combination according to claim 2 wherein the second logical circuit means are capable of producing an alarm signal whenever the outputs of half of the playback units are of different meaning from those of the other half.

4. In a magnetic spot recording system wherein information is recorded on a movable magnetic storage medium, the combination of means for recording each binary digit of information in a plurality of channels of the medium, in accordance with one code in half of the channels and in accordance with another code in the other half, playback units associated with said channels and driven substantially simultaneously by the recordings of each binary digit, settable means for producing an output signal representative of each binary digit played back by the playback units, and logical circuit means controlled by the playback units and capable of setting the settable means to produce a signal representative of the binary digit played back by a majority of the playback units.

5. The combination according to claim 4 and including a second logical circuit means controlled by the playback units and capable of producing an error indicating signal whenever a majority, but not all, of the outputs of the playback units represent the same binary digit.

6. The combination according to claim 5 wherein the second logical circuit means are capable of producing an alarm signal whenever the outputs of half of the playback units represent binary one while those of the other half represent binary zero.

7. In a magnetic spot recording system wherein information is recorded on a movable magnetic storage medium, the combination of means for recording each binary digit of information in a plurality of channels of the medium, binary one being represented by magnetized spots in a first half of the channels and the absence of spots in the second half, and binary zeroes being represented by magnetized spots in the second half channels and by the absence of spots in the first half of the channels, playback units associated with said channels and driven substantially simultaneously by the recordings and lack of recordings for each binary digit, settable means for producing an output signal representative of each binary digit played back by the playback units, logical circuit means controlled by the playback units for setting the settable means to produce a signal representative of the binary digit played back by a majority of the playback units at each operation of the latter, and a second logical circuit means controlled by the playback units for producing an error indicating signal whenever a majority, but not all, of the outputs of the playback units represent the same binary digit, and for producing an alarm signal when the outputs of half of the playback units for each half of the channels represent binary one while the other half represent binary zero.

8. The combination according to claim 7 wherein the binary digits recorded on the magnetic medium are arranged in groups each containing a predetermined number of digits and an end-of-word-representation is recorded after each group, and including an end-of-word-signal producing circuit controlled by the playback units to produce a said signal on playback of an end-of-word-representation, a counter advanced one step for each binary digit played back by the playback units and reset by the end-of-word-signals, circuit means controlled by the counter and by the end-of-word-signals to produce an alarm signal whenever an end-of-word-signal occurs after some number of digits other than said predetermined number have been played back.

9. The combination according to claim 8 wherein the first logical circuit means includes first and second coincidence gates, the first controlled by the outputs of the playback units for the first half of the channels and the second by the outputs of the playback units for the second half of the channels, first and second "or" gates controlled in the same manner as said coincidence gates, third and fourth coincidence gates controlled, the third, by the output of the second coincidence gate and the inversion of the output of the first, and the fourth controlled by the output of the first coincidence gate and the inversion of the output of the second, means for producing such inversions, fifth and sixth coincidence gates controlled, the fifth by the output of the second "or" gate and the inversion of the output of the first "or" gate, and the sixth by the output of the first "or" gate and the inversion of the output of the second, means for producing the last said inversions, third and fourth "or" gates controlled, the third by the output of the fourth and sixth coincidence gates, and means controlled by said third and fourth "or" gates for setting said settable means to opposite states.

10. The combination according to claim 9 wherein the second logical circuit comprises a first coincidence circuit controlled by the output of the playback unit for one channel of the first half of the channels and the inversion of the output of the other channel of said half, a second coincidence circuit controlled by the output of the playback unit for said other channel of the first half of the channels and by the inversions of the output of the playback unit for the said first channel, a third coincidence circuit controlled by the output of the playback unit for a first channel of the second half of the channels and by the inversion of the output of the playback unit for the second channel of said second half of the channels, a fourth coincidence circuit controlled by the output of the playback unit for the second channel of said second half of the channels and by the inversion of the output of the playback unit for the first channel of said second half of the channels, said playback units including means for producing said inversion, a first "or" circuit controlled by the first and second coincidence circuits, a second "or" circuit controlled by the third and fourth coincidence circuits, a fifth coincidence circuit controlled by the first and second "or" circuits, circuit means controlled by the fifth coincidence circuit for producing the alarm signal, a third "or" circuit controlled by the outputs of the first and second "or" circuits and circuit means controlled by the third circuit for producing the error indicating signal.

11. The combination according to claim 10 wherein the end-of-word-signal producing means includes a coincidence gate controlled by the outputs of the playback units for all of the channels and circuit means driven by said coincidence gate to produce the said signals.

12. The combination according to claim 7 wherein each of the playback units includes a flip-flop set to one state on playback of a magnetized spot in the associated channel of the magnetic storage medium, the outputs of said playback units and the inversions thereof being taken from the flip-flops, and including means for setting all of the flip-flops to the opposite state a predetermined time after a first one thereof has been set to the said one state under control of the magnetic storage medium.

13. The combination according to claim 12 wherein the means for resetting the flip-flops includes an "or" gate controlled by the outputs of all of the flip-flops, a Phantastron unit controlled by an "or" gate to produce a control pulse a predetermined time after energization thereof, and resetting means for the flip-flops energized by the lagging edge of each of said control pulse.

14. The combination according to claim 13 wherein the binary digits recorded on the magnetic medium are arranged in groups each containing a predetermined number of digits and an end-of-word-representation is recorded after each group, and including an end-of-word-signal producing circuit controlled by the playback units to produce a said signal on playback of an end-of-word-representation, a counter, an "or" circuit controlled by said control pulses and said end-of-word-signals to advance the counter except when said pulses and signals coincide, the counter being reset by the end-of-word-signals, circuit means controlled by the counter and by the end-of-word-signals to produce an alarm signal whenever an end-of-word-signal occurs after some number of digits other than said predetermined number have been played back.

15. The combination according to claim 14 wherein first logical circuit means includes first and second coincidence gates, the first controlled by the outputs of the playback units for the first half of the channels and the second by the outputs of the playback units for the second half of the channels, first and second "or" gates controlled in the same manner as said coincidence gates, third and fourth coincidence gates controlled, the third by the output of the second coincidence gate and the inversion of the output of the first, and the fourth by the output of the first coincidence gate and the inversion of the output of the second, means for producing such inversions, fifth and sixth coincidence gates controlled, the fifth by the output of the second "or" gate and the inversion of the output of the first "or" gate and the sixth by the output of the first "or" gate and the inversion of the output of the second, means for producing the last said inversions, third and fourth "or" gates controlled, the third by the output of the fourth and sixth coincidence gates and the fourth by the third and fifth coincidence gates, and means controlled by said third and fourth "or" gates and by said control pulses for setting said settable means to opposite states.

16. The combination according to claim 15 wherein the second logical circuit comprises a first coincidence circuit controlled by the output of the playback unit for one channel of the first half of the channels and the inversion of the output of the other channel of said half, a second coincidence circuit controlled by the output of the playback unit for said other channel of the first half of the channels and by the inversion of the output of the playback unit for the said first channel, a third coincidence circuit controlled by the output of the playback unit for a first channel of the second half of the channels and by the inversion of the output of the playback unit for the second channel of said second half, a fourth coincidence circuit controlled by the output of the playback unit for the second channel of said second half of the channels and by the inversion of the output of the playback circuit for the first channel of said second half, said playback units including means for producing said inversions, a first "or" circuit controlled by the first and second coincidence circuits, a second "or" circuit controlled by the third and fourth coincidence circuits, a fifth coincidence circuit controlled by the first and second "or" circuits, circuit means controlled by the fifth coincidence circuit for producing the alarm signal, a third "or" circuit controlled by the outputs of the first and second "or" circuits, and circuit means controlled by the third circuit and said controlled pulses for producing the error indicating signal.

17. The combination according to claim 16 wherein the end-of-word-signal producing means includes a coincidence gate controlled by the outputs of the playback units for all of the channels and circuit means driven by said coincidence gate and said controlled pulses to produce the said signals.

18. In a magnetic spot recording system wherein information is recorded on a movable magnetic storage medium, the combination of means for recording each item of information in a plurality of channels of the medium, playback units associated with said channels and driven substantially simultaneously by the recordings of each item of information, settable means for producing an output signal representative of each item played back by the playback units, logical circuit means controlled by the playback units and capable of setting the settable means to produce a signal representative of the item of information played back by a majority of the playback units, and capable of producing an alarm when no majority exists.

19. The combination according to claim 18 wherein the logical circuit means are also capable of producing an error indicating signal whenever a majority, but not all, of the outputs of the playback units are alike.

20. In a magnetic spot recording system wherein information is recorded on a movable magnetic storage medium, the combination of means for recording each binary digit of information in a plurality of channels of the medium, playback units associated with said channels and driven substantially simultaneously by the recordings for each binary digit, settable means for producing an output signal representative of each binary digit played back by the playback units, logical circuit means controlled by the playback units for setting the settable means to produce a signal representative of the binary digit played back by a majority of the playback units at each operation of the latter, and a second logical circuit means controlled by the playback units for producing an error indicating signal whenever a majority, but not all, of the outputs of the playback units represent the same binary digit, and for producing an alarm signal when no majority exists.

21. The combination according to claim 20 wherein the binary digits recorded on the magnetic medium are arranged in groups each containing a predetermined number of digits and an end-of-word-representation is recorded after each group, and including an end-of-word-signal producing circuit controlled by the playback units to produce a said signal on playback of an end-of-word-representation, a counter advanced one step for each binary digit played back by the playback units and reset by the end-of-word-signals, circuit means controlled by the counter and by the end-of-word-signals to produce an alarm signal whenever an end-of-word-signal occurs after some number of digits other than said predetermined number have been played back.

22. Means for maintaining a high degree of reproduction accuracy in magnetic spot recording systems which comprises means for simultaneously recording each item of information in a plurality of channels of a magnetic storage medium, each item being recorded in one way in half of said channels and in another way in the other half, means for simultaneously sensing the recordings in said channels and means for operating logically on the output of said sensing means to produce signals indicative of the information represented by a majority of the outputs.

23. Means for maintaining a high degree of reproduction accuracy in magnetic spot recording systems which comprises means for simultaneously recording each item of information in a plurality of channels of a magnetic storage medium, each item being recorded in one way in half of said channels and in another way in the other half, means for simultaneously sensing the recordings in said channels, means for operating logically on the outputs of said sensing means to produce signals indicative of the information represented by a majority of the outputs where a majority exists, and to produce an error indicating signal where a majority does not exist.

References Cited in the file of this patent

UNITED STATES PATENTS

| | | |
|---|---|---|
| 2,609,143 | Stibitz | Sept. 2, 1952 |
| 2,628,346 | Burkhart | Feb. 10, 1953 |